United States Patent
Wiley

(10) Patent No.: US 7,646,288 B2
(45) Date of Patent: Jan. 12, 2010

(54) OCCUPANT WARNING SYSTEM FOR SCHOOL OR DAY CARE BUS AND VAN

(76) Inventor: Alex T. Wiley, 2799 Broad Ave., Memphis, TN (US) 38112

( * ) Notice: Subject to any disclaimer, the term of this patent is extended or adjusted under 35 U.S.C. 154(b) by 236 days.

(21) Appl. No.: 11/928,607

(22) Filed: Oct. 30, 2007

(65) Prior Publication Data
US 2009/0109010 A1  Apr. 30, 2009

(51) Int. Cl.
B60Q 1/26 (2006.01)

(52) U.S. Cl. .............. 340/433; 340/425.5; 340/430; 340/438; 340/457; 340/309.4; 340/309.7; 340/573.1; 307/10.2; 307/10.3

(58) Field of Classification Search .......... 340/433, 340/425.5, 430, 438, 457, 527, 528, 309.16, 340/309.7, 309.4, 573.1; 307/10.2, 10.3, 307/10.6
See application file for complete search history.

(56) References Cited

U.S. PATENT DOCUMENTS

| 5,874,891 | A | * | 2/1999 | Lowe | 340/433 |
| 5,949,340 | A | * | 9/1999 | Rossi | 340/573.1 |
| 6,107,915 | A | * | 8/2000 | Reavell et al. | 340/433 |
| 6,259,358 | B1 | * | 7/2001 | Fjordbotten | 340/433 |
| 7,158,014 | B2 | * | 1/2007 | Lahr et al. | 340/433 |

* cited by examiner

Primary Examiner—Hung T. Nguyen
(74) Attorney, Agent, or Firm—David W. Barman; Robert M. Schwartz

(57) ABSTRACT

The present invention is a warning system for alerting a driver and others to ensure an examination is made of a school or day care bus or van is thoroughly examined for remaining occupants following a transportation run.

16 Claims, 2 Drawing Sheets

OCCUPANT WARNING SYSTEM FOR SCHOOL OR DAY CARE BUS AND VAN

BACKGROUND OF THE INVENTION

1. Field of the Invention

The present invention relates to an apparatus for alerting a driver and others to ensure a school or day care bus or van is thoroughly examined for remaining occupants following a transportation run. The warning system provides the driver with a verbal instruction to examine the vehicle for remaining occupants upon the turning off of the vehicle ignition system. Subsequent to the initiation of the verbal instruction, after a predetermined time, if the system has not been instructed that the check has been made, a separate alarm (e.g., a siren) will sound to prompt the inspection for remaining occupants.

2. General Background of the Invention

Upon completion of transportation runs as at the unloading of pupils carried to a school or day care facility, or after their return to the original pick-up-point, the transportation vehicle is parked in a garage or parking lot. Typically, the vehicle is stored in such a location for periods of several hours upwards to overnight or a week-end. Typically, transportation companies have policies which require drivers to examine the vehicle upon completion of a run however, there are sufficient incidents of a breach of the policy or an incomplete check that such as children or mentally challenged individuals are left aboard. The results of the oversight may be devastating in the instances involving infant children or severely handicapped individuals. Injury ranging from dehydration, and heat prostration to death from overheating, or conversely overexposure, has been reported.

Unfortunately children may fall asleep during the ride or not awaken when the vehicle reaches their destination, or even the end of the run. Similarly, an infant or a severely handicapped individual may fall asleep, or may not even be able or cognizant to provide some indication of their presence aboard at the end of the run. Accordingly, without a sufficient check, these passengers are in danger of being forced to remain aboard for significant periods of time. Further complicating the matter is the likelihood that the vehicle is parked in a remote location where the crying or screams of child or infant may not be sufficiently loud to be heard at any distance from the vehicle.

Actual injury and loss of life have been experienced often enough to cause public outrage and action by local and state governments for programs of training and development of back-up equipment or systems to ensure some level of compliance with an examination for remaining occupants. Patents have issued on at least two alarm systems which are intended to address the existing problem. While these prior art devices are certainly made to provide some level of warning if a regimen is not followed, they are viewed as not completely addressing the needs of an operational system which will address all operating conditional.

U.S. Pat. No. 5,128,651 describes an alarm system for a school bus which includes a rear mounted deactivation switch to defeat an alarm sounding that has been triggered by the turning off of the vehicle ignition switch. The described system is armed by the action of a door switch on the first opening of door or operation of the safety warning system including the red warning lights. The illustrated alarm system would not be activated if the bus was loaded prior to the starting of the engine (operation of the ignition switch). U.S. Pat. No. 5,243,323 describes another system for the reminding of a driver to check that all passengers have exited the vehicle before the vehicle is parked or secured. In this system, an alarm (buzzer) sounds when the ignition is turned off, as at the end of a transportation run, which is silenced by the driver going to the rear of the bus and operation of a cut-off switch to silence the buzzer. The driver is expected to view the bus seats on the walk to the rear of the bus to determine that there are no passengers remaining aboard prior to activation of the cut-off switch. The system includes a second alarm system utilizing such as the vehicle horn and/or lights activated by a timer should the driver not activate the cut-off switch prior to a predetermined time. The disclosed system also includes a service switch which totally disables the safety system should the vehicle be taken to a service facility. The rationale is provided that the maintenance personnel would be disrupted in their work should the alarms be set off during the maintenance/service procedures. The described system optionally includes a buzzer warning system to signal on operation of the vehicle with the alarm system deactivated.

Experience with systems of the type described above has proven to be less than effective for avoiding the problem of children being left in a vehicle after a school or day care bus or van run. Firstly, such warning systems as buzzers which are activated at the turning off of the vehicle ignition switch are not effective in causing the driver to search the vehicle for remaining occupants. It serves primarily as a stimulant to the driver to go the rear of the vehicle and turn off the warning system. Unfortunately, in that trip to the rear of the vehicle, the driver's mind is focused on the turning off of the buzzer and not the primary goal of searching the bus. The present invention incorporates a voice reminder system in place of the buzzer, and the voice message continually reminds the driver of the primary objective of "Please, check all seats for occupants", or some equivalent reminder. Surprisingly, this voice message, delivered in a pleasant tone, captures the driver's attention to perform the task at hand, i.e., search the vehicle and then turn off the message after the search has been completed. As with the other patented systems, the disable switch is located at the back of the vehicle such that it may be operated upon completion of the check. Guarding against the possibility that the check isn't done, or that the voice message malfunction, if the disable switch is not operated within a predetermined period of time, a siren is sounded. A siren or equivalent alarm system is selected over sounding the vehicle horn or flashing of the lights because the siren is a more recognizable signal of an event, the sound being transmitted to a far greater area than horn and lights.

A second aspect of the present invention is in the maintenance disable system for the warning system. Rather than a master disable switch which totally disables the system as is described in one of the above patents, the present invention incorporates a check regimen even when the system is disabled. The present inventive disable system for such as the performance of maintenance is operable by the service technician however, requires a similar voice prompted vehicle search and operation of the disable switch at the back of the vehicle prior to going into a standby condition. In view of the fact that children have actually been carried to a repair facility in a vehicle taken out of service, this feature is viewed as important to a totally responsive system. Thus, it should be understood that the present system requires a check of the vehicle whether on driver shut-down or on shut-down for maintenance.

BRIEF SUMMARY OF THE INVENTION

The present invention incorporates a voice reminder system in a warning system for a school or day care bus or van to ensure adequate examination of the vehicle upon completion of a run. The voice message continually reminds the driver of the primary objective of "Please, check all seats for occupants", or some equivalent reminder. Surprisingly, this voice message, delivered in a pleasant tone, captures the driver's attention to perform the task at hand, i.e., search the vehicle and then turn off the message after the search has been completed. The disable switch is located at the back of the vehicle such that it may be operated upon completion of the check and be located beyond the physical reach of the operator when located in the driver's seat. Guarding against the possibility that the check isn't done, or that the voice message malfunction, if the disable switch is not operated within a predetermined period of time, a siren is sounded. A siren or equivalent distinctive alarm system is selected over sounding the vehicle horn or flashing of the lights because the siren is a more recognizable signal of an event, the sound being transmitted to a far greater invention is conveniently consolidated in an electrical box or cabinet B as is known in the art. Two switches S1 and S2 which are integral to the warning system W are located externally of the box B, in selected locations to enhance the operation of the system W. Standby switch S1 is preferably a keyed, or otherwise secure lock-type switch which is operable (as subsequently described) to disengage the operation of the warning system for maintenance on the vehicle or other collateral reasons. Search switch S2 is placed in a remote location of the vehicle such that the operator must traverse the extent of the vehicle to search for stragglers who did not exit the vehicle at appointed stops. It is the function of the search switch S2 to discontinue a voice prompt instructing the search and to preempt the turning on of flashing lights and a siren to publish an alarm indicating that the appropriate search had not been accomplished (as by neglecting to actuate the search switch S2) in a timely manner.

DETAILED DESCRIPTION OF THE PREFERRED EMBODIMENT

Figure 2:
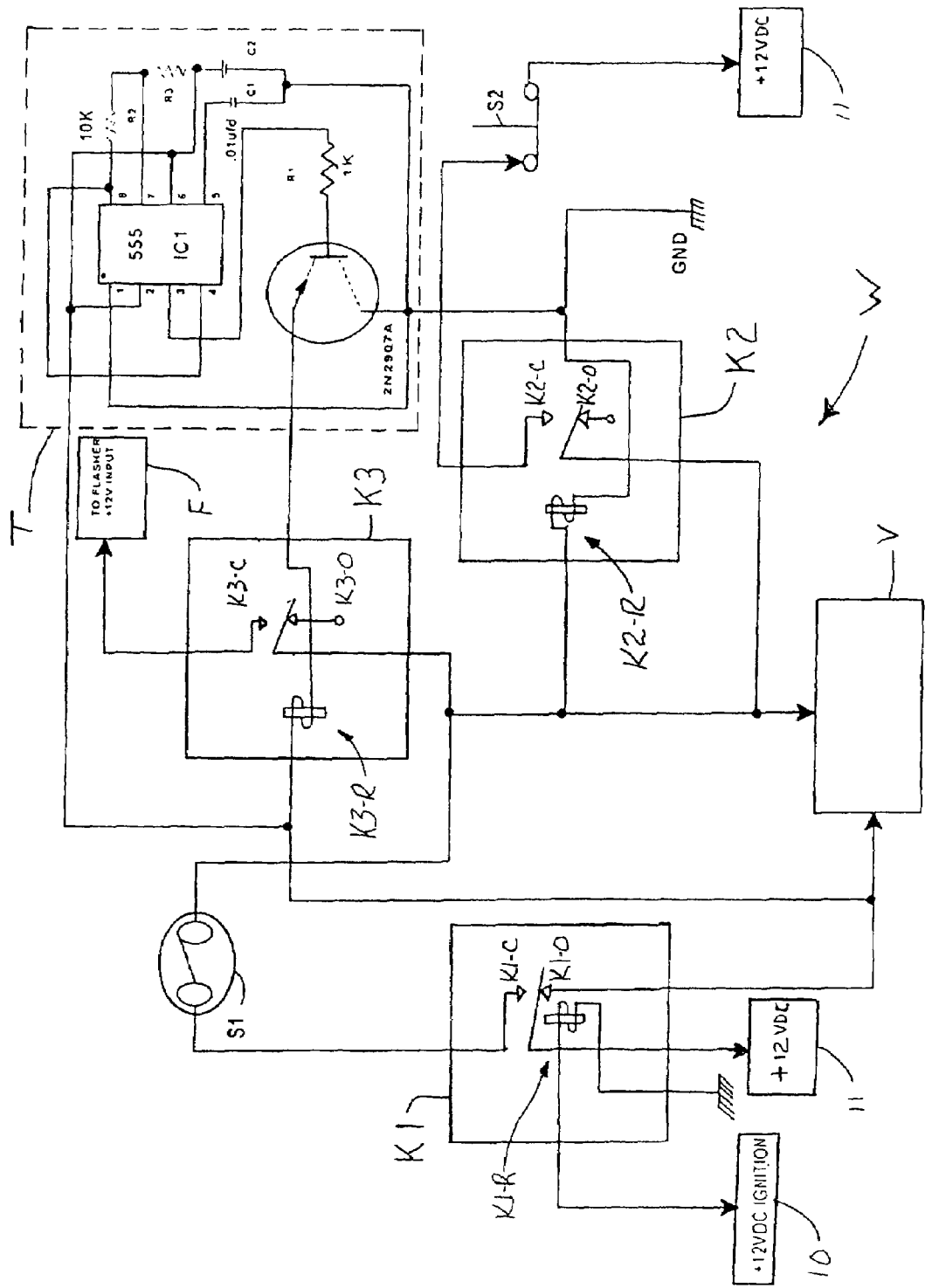
FIG. 2 is an electrical schematic of the warning system of the present invention.

Referring now to FIG. 2, the electrical schematic for the warning system W of the present invention is illustrated. Warning system W including its operative components is preferably contained within a conventional electronics box or cabinet B (not shown) for convenient mounting within such as the engine compartment of a vehicle which is equipped with system W. The warning system W is illustrated in its quiescent state, namely prior to the energizing of the main K1 relay coil KR from the ignition source 10 by actuation of the ignition switch (not shown) of a vehicle equipped with system W. As illustrated, initial state of relay K1 positions contact K1-O (or the "normally open") at the open contact position, and is illustrated as completing the connection of power from the battery/system source 11 to provide 12 VDC power to voice module V (discussed later). Similarly, voice activation relay K2 contact K2-O is shown in the normally open or quiescent state as is alarm relay K3 contact K3-O. As a vehicle operator initiates a run in order to transport passengers by starting the vehicle, 12VDC power is supplied to main relay K1 from ignition source 10, causing relay coil KR-1 to engage relay K1 to the K1-C contact position. With contact K1-C in the energized position, battery/system power is supplied to standby switch S1 which is preferably a single pole, single throw type switch, and as illustrated is in the normally closed position for operation of warning system W. In a preferred embodiment, standby switch S1 is a key operated switch (or equivalent limited access switch) utilized to deactivate the overall system W during maintenance or other conditions when passengers are not being carried. Switch S1 is integral to the warning system W and on initial activation, functions in a manner equivalent to cycle the normal warnings as would the turning off of the vehicle ignition switch as is subsequently described. By so including the standby switch, a search of the vehicle is prompted to ensure that no unauthorized passengers remain aboard.

Thus, on vehicle start-up, battery/system power is provided to relay coil K2-R to energize relay K2 to the contact K2-C position and concurrently close the circuit including voice module V and standby switch S2 to receive 12 VDC power from battery/supply source 12. At this time the trigger of voice module V is energized to be later activated by the action of timing module T as will be subsequently described.

Figure 1:
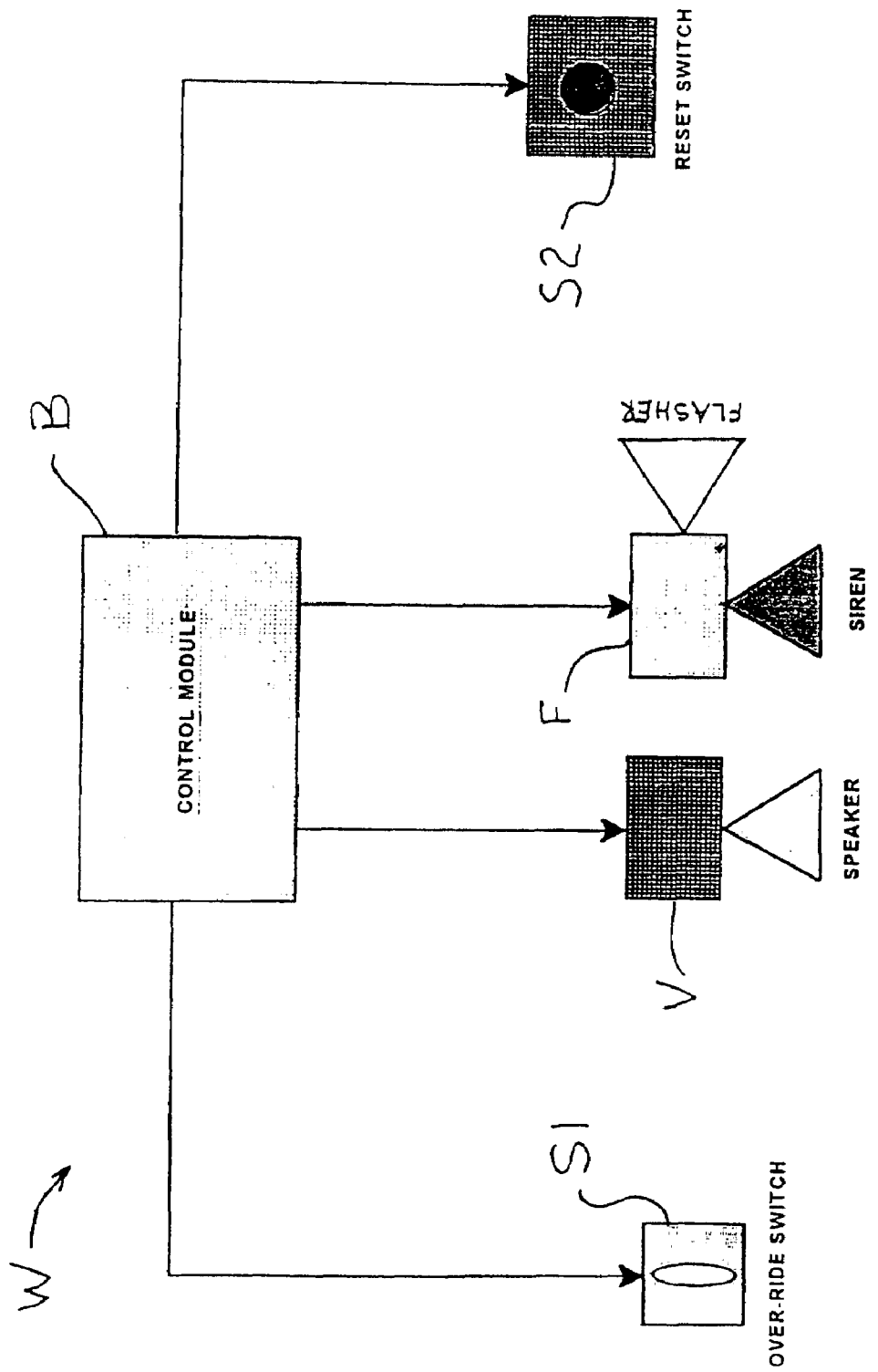
FIG. 1 is a schematic of the warning system of the present invention.

The center control of warning system W is timer T including microprocessor M and transistor Q. Timer T receives its power from relay K1 when ignition source 10 is disabled as by the operator of the vehicle turning off the ignition switch. On such action, the removal of power to the relay coil K1-R allows the relay contact to cycle to the K1-O position such that battery/system source 11 powers T and also relay coil K3-R. With the application of 12 VDC power to relay coil K3-R, the relay K3 engages relay contacts K3-C to the output of transistor Q conducts, a state controlled by timer T, which on conduction closes the K3-R circuit to ground which enables power to flasher/siren alarm F. Flasher/siren alarm receives power to operate after a predetermined period of time preselected to be sufficient for the vehicle operator to survey the bus, once the vehicle ignition switch is turned off, to determine that there are no remaining passengers on the vehicle. As is known by those skilled in the art, varying of values of resistance-capacitance circuits such as those illustrated including R2 and R3 and C1 and C2 is a traditional method of setting a time constant for such as a microcontroller chip MC as is illustrated in FIG. 1. In the present embodiment, the values chosen provide a delay of five minutes, which is felt to be adequate for a thorough survey of the vehicle after shut-down. Thusly, on shut-down of the vehicle and turning the ignition switch to "off", then 12 VDC power is provided to timing circuit T, the countdown begins and at reaching the predetermined value, an output signal is sent to transistor Q, which goes into conduction, thereby providing a ground potential on the relay coil K3-R. As K3-R is energized, contacts K3-C close providing power to the flasher/siren alarm which then flashes the lights (as by an added conventional vehicle flasher or an equivalent device) and activates a conventional siren, providing visual and audible alarms that the stand-by switch was not activated to record the act of vehicle survey by the operator.

Concurrently with the supply of power to the timing circuit T on turning off of the ignition switch and the placing of 12 VDC on the input side of relay coil K3-R, power is also applied to the trigger function of voice module V, causing it to immediately provide the recorded message prompting the vehicle search. In the illustrated embodiment a message of "Warning! Kidde Voice has been activated. Please ensure that all passengers are being removed. Please check this vehicle. Please check this vehicle. Thank you." begins and continues until search switch S2 is activated, breaking the supply of 12 VDC to the voice module trigger M and the power to relay coil K2-R thereby allowing contact K2-O to open and interrupt the supply of 12 VDC power to the flasher/siren alarm F. Upon this action, the warning system remains dormant until the ignition switch is again activated, resetting the circuit elements to the initial operating positions as described above. Search switch S2 may be a spring loaded, push button type switch which provides a momentary opening of the circuit when pushed or a more complicated, electronic switch such as a key pad, however providing a nominal opening of the relevant circuits to allow relays to function to disable the voice module M and the timing circuit T. Incorporation of a key pad for entry of a password or an otherwise secured operation of the search switch S2 may be included to ensure operation only by authorized individuals. Search switch S2 is located at the rear of the vehicle, such that on turning off of the ignition switch, the vehicle operator is required to walk through the vehicle, while listening to the prompt message to remind of the objective of checking the seats and aisles of the vehicle to ensure no unauthorized passengers remain. When the operator reaches the search switch S2, it is activated, thereby terminating the voice prompt and deactivating of the flasher/siren alarm, whether or not either have been activated.

The values of the circuit components described above are listed in the table following the description of the operation of the warning system W.

In operation, the sequence of functions of the circuit components is further illustrated in FIG. 2, wherein POWER UP represents the application of power to the warning system illustrated in FIGS. 1 and 2 as by operation of the ignition switch (not shown) to the on position. Power is normally applied to the system W unless the standby switch S1 has previously been operated to disable the warning system W. As FIG. 3 illustrates, operation of the ignition switch first deactivates K2 and K3, by removing battery voltage from source 11 (illustrated on FIG. 2). The control then notes if the ignition switch is on, upon which relay K1 is energized, relay K2 is energized, which removes activating 12 VDC power from the voice module and the timing circuit T and then, restores the power to the voice module trigger, and sampling continues until the ignition switch is sensed to be turned off. At this time, power is applied to the timing circuits and the voice circuit for so long as the standby switch S2 remains closed. Upon opening search switch S2, the function of relays K2 and K3 will be deactivated such that the voice module ceases the prompt message and the timing of the circuit will be interrupted such that the flasher/siren alarms are not triggered. Should the search switch not be opened (or activated), the timing function will continue for the constant set by the resistance-capacitance circuits and the alarms will operate when the time limit is reached.

In one embodiment, the invention further comprises a mechanism for locking the main door of the bus until the disable switch at the rear of the vehicle is activated. Thus ensuring the driver walks to the rear of the bus prior to exiting. The locking mechanism may be any suitable apparatus including, mechanical, electrical, or magnetic locks.

The system would include an emergency override of the main door lock such that the door may be opened in emergencies.

The several elements and parts of the invention described and illustrated herein are listed in the Parts List below:

PARTS LIST

Part Number Description Electrical Value
10 ignition source
11 battery/system source
B box
C1 capacitor 0.01 μfd.
C2 capacitor 470 μfd.
F flasher/siren alarm
K1 relay single pole, single throw
K2 relay single pole, single throw
K3 relay single pole, single throw
M microcontroller 555 CMOS
Q transistor 2N29Q7A
R1 resistor 1 KΩ
R2 resistor 10 KΩ
R3 resistor 1 MΩ
S1 standby switch on/off
S2 search switch normally closed, push button
T timing module
W warning system The foregoing embodiments are presented by way of example only; other modifications, variations and changes may be suggested to those skilled in the art in view of the teachings hereof. It is therefore to be understood that all such variations, modifications and changes are believed to fall within the scope of the present invention and the scope of the present invention is to be limited only by the following claims.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A warning system for prompting a search of a passenger carrying vehicle for remaining passengers upon completion of a use of the vehicle, the system being selectively connectable to the vehicle electrical power system responsive to the positioning of an ignition switch of the vehicle, comprising:

a) a switch actuated by a change of position of the ignition switch for alternatively connecting elements of the warning system to the vehicle electrical power system;

b) a voice module in said warning system for providing a repeating audible voice message upon positioning the ignition switch to its "off" position following the ignition switch having been positioned to its "on" position;

c) a timer in said warning system for timing a predetermined period of time following positioning the ignition switch to its "off" position following the ignition switch having been positioned to its "on" position;

d) alarm for providing an alarm initiated by said timer following a predetermined time signaled by said timer following positioning the ignition switch to its "off" position following the ignition switch having been positioned to its "on" position;

e) switch for disabling said voice module and said alarm, said switch being physically mounted in the vehicle at a distance from the ignition switch greater than the physical reach of an operator of the vehicle;

whereby upon positioning the ignition switch to its "off" position following the ignition switch having been positioned to its "on" position, said voice module prompts a search for remaining passengers in the vehicle and a later timed alarm is actuated if not disabled by activation of said switch subsequent to positioning the ignition switch to its "off" position following the ignition switch having been positioned to its "on" position; and f) a standby switch positioned electrically in series with the ignition switch and said warning system, said standby switch operably disabling said voice module and alarm on subsequent positioning of the ignition switch to its "on" position following the ignition switch having been positioned to its "off" position whereby said standby switch disables said warning system only after a full cycle of operation of said warning system including activation of said switch or activation of said voice module and alarm.

2. The warning system of claim 1 wherein said alarm is a siren.

3. The warning system of claim 1 wherein said alarm includes a mechanism for flashing the vehicle headlamps.

4. The warning system of claim 2 wherein said alarm includes flashing the vehicle headlamps.

5. The warning system of claim 1 wherein said switch is a momentary disconnecting switch.

6. The warning system of claim 5 wherein said switch is a push button switch.

7. The warning system of claim 5 wherein said switch is a key operated switch.

8. The warning system of claim 5 wherein said switch is a key pad operated switch.

9. The warning system of claim 1 wherein said alarm is a siren.

10. The warning system of claim 1 wherein said alarm includes for flashing the vehicle headlamps.

11. The warning system of claim 1 wherein said switch is a momentary disconnecting switch.

12. The warning system of claim 11 wherein said switch is a push button switch.

13. The warning system of claim 11 wherein said switch is a key operated switch.

14. The warning system of claim 11 wherein said switch is a key pad operated switch.

15. The warning system of claim 1 having a front door lock that is released when the switch at the rear of the bus is activated.

16. The warning system of claim 15 wherein said front door lock further includes an emergency override located in the front of a bus.

* * * * *